(12) United States Patent
Lee et al.

(10) Patent No.: US 8,405,271 B2
(45) Date of Patent: Mar. 26, 2013

(54) INTERIOR PERMANENT MAGNET TYPE BRUSHLESS DIRECT CURRENT MOTOR

(75) Inventors: Kyung-Hoon Lee, Seoul (KR); Jun-Ho Ahn, Seoul (KR)

(73) Assignee: LG Electronics Inc., Seoul (KR)

(*) Notice: Subject to any disclaimer, the term of this patent is extended or adjusted under 35 U.S.C. 154(b) by 630 days.

(21) Appl. No.: 12/609,052

(22) Filed: Oct. 30, 2009

(65) Prior Publication Data

US 2010/0194228 A1 Aug. 5, 2010

(30) Foreign Application Priority Data

Feb. 5, 2009 (KR) ........................ 10-2009-0009475

(51) Int. Cl.
*H02K 1/27* (2006.01)
*H02K 21/12* (2006.01)
(52) U.S. Cl. .......... 310/156.57; 310/156.46; 310/156.53
(58) Field of Classification Search ............. 310/156.57, 310/156.53, 156.56, 156.46; *H02K 1/27, H02K 21/12, 21/14, 21/16*
See application file for complete search history.

(56) References Cited

U.S. PATENT DOCUMENTS

| | | | | |
|---|---|---|---|---|
| 5,864,191 A | * | 1/1999 | Nagate et al. | 310/156.53 |
| 6,047,460 A | * | 4/2000 | Nagate et al. | 29/598 |
| 6,087,752 A | | 7/2000 | Kim et al. | |
| 6,147,428 A | | 11/2000 | Takezawa et al. | |
| 6,208,054 B1 | | 3/2001 | Tajima | |
| 6,917,133 B2 | * | 7/2005 | Koharagi et al. | 310/156.57 |
| 6,967,424 B2 | * | 11/2005 | Popov | 310/156.57 |
| 7,119,507 B2 | | 10/2006 | Nishijima | |
| 7,425,786 B2 | | 9/2008 | Hino | |
| 2002/0051715 A1 | | 5/2002 | Matsumoto et al. | |
| 2003/0178905 A1 | | 9/2003 | Koharagi et al. | |
| 2004/0080228 A1 | * | 4/2004 | Ahn et al. | 310/156.56 |
| 2004/0256940 A1 | | 12/2004 | Tsuruta et al. | |
| 2006/0145556 A1 | | 7/2006 | Aota | |
| 2007/0126304 A1 | | 6/2007 | Ito et al. | |
| 2007/0126305 A1 | | 6/2007 | Okuma et al. | |
| 2008/0203842 A1 | | 8/2008 | Yoshikawa et al. | |
| 2009/0224627 A1 | | 9/2009 | Hino et al. | |
| 2009/0261679 A1 | | 10/2009 | Sakai et al. | |

FOREIGN PATENT DOCUMENTS

| | | |
|---|---|---|
| EP | 0872944 A1 | 10/1998 |
| EP | 1160956 A2 | 12/2001 |
| EP | 1942572 A1 | 7/2008 |
| EP | 2099114 A2 | 9/2009 |

OTHER PUBLICATIONS

European Search Report dated May 26, 2011 for Application No. 10152460.1, 11 pages.

* cited by examiner

*Primary Examiner* — Tran Nguyen
*Assistant Examiner* — Michael Andrews
(74) *Attorney, Agent, or Firm* — Fish & Richardson P.C.

(57) ABSTRACT

An interior permanent magnet type brushless direct current (BLDC) motor includes a stator having a plurality of slots and a stator coil wound on the slots. The interior permanent magnet type brushless direct current (BLDC) motor also includes a rotor that rotates with respect to the stator and that has a rotor core and a plurality of permanent magnets positioned in the rotor core. The rotor has a notch that is cut off between adjacent permanent magnets.

19 Claims, 8 Drawing Sheets

INTERIOR PERMANENT MAGNET TYPE BRUSHLESS DIRECT CURRENT MOTOR

CROSS-REFERENCE TO RELATED APPLICATIONS

The present application claims the benefit of priority to Korean Application No. 10-2009-0009475, filed on Feb. 5, 2009, the contents of which is incorporated by reference herein in its entirety.

FIELD

The present disclosure relates to an interior permanent magnet type brushless direct current (BLDC) motor and a compressor.

BACKGROUND

Motors may be classified into a direct current (DC) motor and an alternating current (AC) motor depending on power used. The DC motor has a commutator and a brush. Due to a mechanical contact between the commutator and the brush, reliability of the DC motor is lowered and a lifespan thereof may be shortened.

An electronic switching type brushless DC (BLDC) motor using a semiconductor device also has been used. The BLDC motors may be classified into an interior rotor type and an exterior rotor type according to an arrangement of stator and rotor.

The interior rotor type motor either uses a rotor that a rotation shaft is inserted into a center of a cylindrical permanent magnet, or uses a so-called interior permanent magnet type rotor that a rotation shaft is inserted into a center of a rotor core having electrical steel sheets stacked thereon and then a plurality of permanent magnets are inserted in the rotor core.

The interior permanent magnet type rotor has a core on which a plurality of circular electrical steel sheets are stacked for insulation. The core includes a shaft hole formed there through such that a rotation shaft can be inserted therein. Also, the core includes permanent magnet holes passed through a periphery of the shaft hole such that a plurality of permanent magnets can be positioned therein in an axial direction.

The interior permanent magnet type rotor has a flux barrier defined at both end regions of each permanent magnet for reducing a leakage of flux of each permanent magnet. However, the interior permanent magnet type BLDC motor having the interior permanent magnet type rotor may generates a relatively great torque ripple, resulting in the chance of an occurrence of relatively high vibration and noise.

SUMMARY

In one aspect, an interior permanent magnet type brushless direct current (BLDC) motor includes a stator having a plurality of slots and a stator coil wound on the slots. The motor also includes a rotor configured to rotate with respect to the stator and having a rotor core and a plurality of permanent magnets positioned in the rotor core. The rotor is configured to have a notch that is cut off between adjacent permanent magnets.

Implementations may include one or more of the following features. For example, a ratio of a depth of the notch to a gap between the stator and the rotor is in the range of 1.0 to 4.0. The notch is configured to have a maximum depth at a center thereof. The notch is configured to have an arcuate shape.

In some implementations, the notch is configured to have a shape of a "V", a triangle or a square. A center of the notch is positioned on a central line between the magnetic pole portions. A coupling hole is positioned in the rotor core and configured to be located on the central line.

In some examples, at least one exhaust hole is positioned between two regions from the central line of the rotor core and configured to have balance regarding size between two regions. A tooth of the stator is configured to engage with the notch.

In another aspect, an interior permanent magnet type brushless direct current (BLDC) motor includes a stator having a plurality of slots and configured to fix the motor. The motor also includes a rotor configured to rotate with respect to the stator and having a rotor core and a plurality of permanent magnets positioned in the rotor core. The motor further includes a plurality of barriers positioned at each end of the permanent magnets, respectively. In addition, the rotor is configured to have a notch that is cut off between adjacent barriers.

Implementations may include one or more of the following features. For example, a ratio of a depth of the notch to a gap between the stator and the rotor is in the range of 1.0 to 4.0. A center of the notch is positioned on a central line between the barriers. A coupling hole is positioned in the rotor core and configured to be located on the central line.

In some implementations, at least one exhaust hole is positioned between two regions from the central line of the rotor core and configured to have balance regarding size between two regions. A tooth of the stator is configured to engage with the notch.

In yet another aspect, an interior permanent magnet type brushless direct current (BLDC) motor includes a stator having a plurality of slots and a stator coil wound on the slots. The motor also includes a rotor configured to rotate with respect to the stator and having a rotor core, a plurality of permanent magnets positioned in the rotor core, and a plurality of cut off portions. In addition, a first cut off portion positioned between adjacent permanent magnets and a second cut off portion configured to have a different shape from the first cut off portion and positioned between the first cut off portions.

Implementations may include one or more of the following features. For example, a non cut off portion is positioned between the first cut off portion and the second cut off portion. A ratio of an inner angle of the non cut off circumferential portion to an inner angle from a central line between adjacent magnetic pole portions to one end of the first cut off portion is in the range of 0.5 to 3.0.

In some implementations, the second cut off portion is positioned at outside of the permanent magnet. The second cut off portion is configured to be aligned cut off linearly. A ratio of an inner angle of the linear cut-off portion to an inner angle between a horizontal axis portion and one end of the first cut off portion is in the range of 5 to 20.

In yet another aspect, an interior permanent magnet type brushless direct current (BLDC) motor includes a stator having a plurality of slots and a stator coil wound on the slots. The motor also includes a rotor configured to rotate with respect to the stator and having a rotor core and at least one permanent magnet positioned in the rotor core. The motor further includes a barrier positioned at end of the permanent magnets. In addition, the rotor is configured to have a non cut off portion positioned outside the barrier, a linear cut off portion positioned outside the permanent magnet and the linear cut off portion starts at one end of the non cut off portion.

Implementations may include one or more of the following features. For example, the linear cut off portion ends at a first tooth of the stator from a reference tooth. The linear cut-off portion is configured to have a maximum depth at the start region. The linear cut-off portion is configured to have a maximum depth at a center of the linear cut off portion.

DETAILED DESCRIPTION

Figure 1:
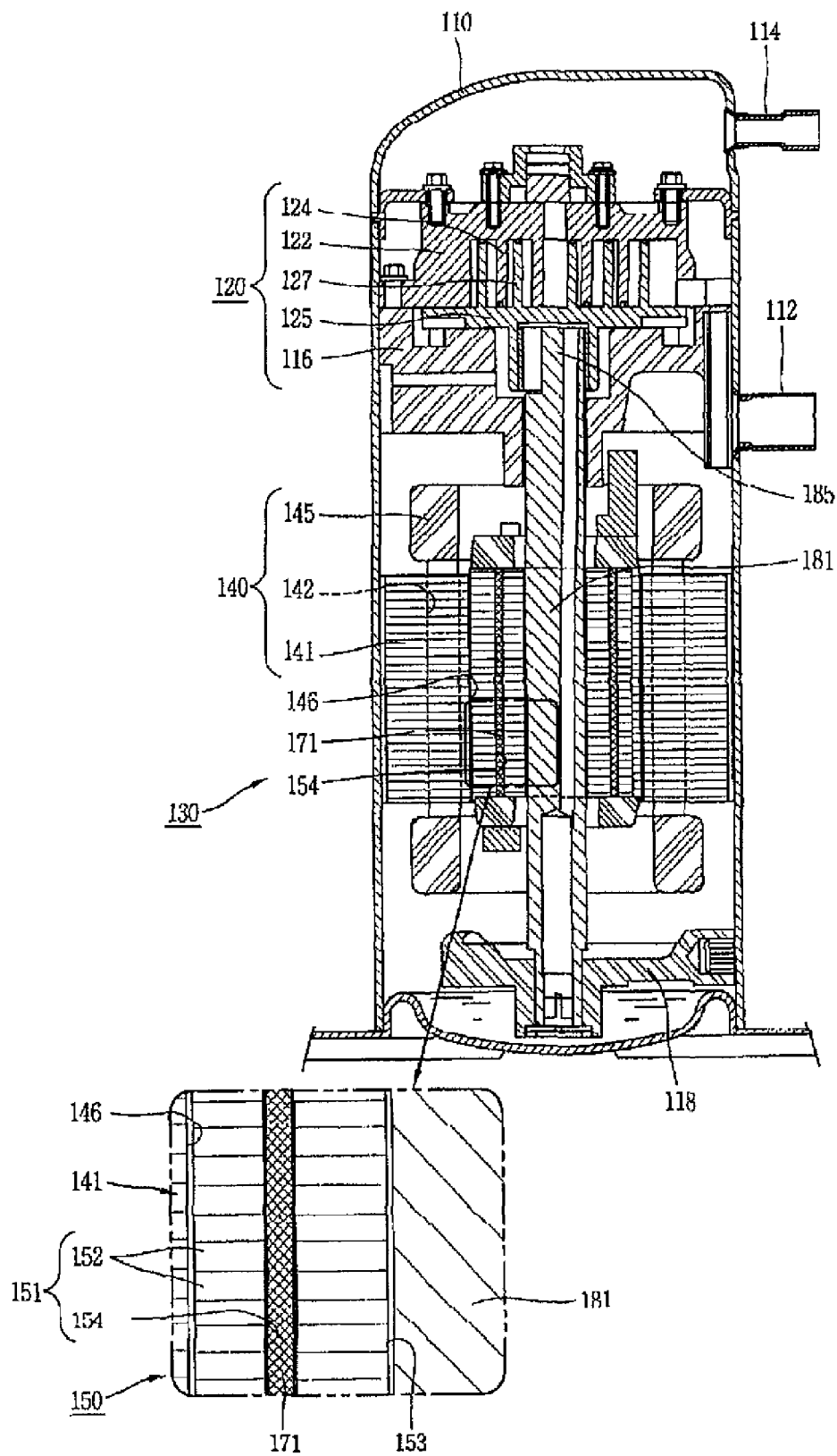
FIG. 1 is a cross-sectional view of a compressor having an interior permanent magnet type BLDC motor.

Referring to FIG. 1, a compressor having an interior permanent magnet type BLDC motor may include a case 110 having an accommodation space therein, a compression part 120 disposed within the case 110 for compressing a refrigerant, and an interior permanent magnet type BLDC motor 130 positioned within the case 110 for providing a driving force to the compression part 120.

A suction pipe 112 may be positioned at one side of the case 110 so that a refrigerant is guided into the case 110, and a discharge pipe 114 may be positioned at one side, namely, at an upper side of the suction pipe 112 so that a compressed refrigerant is discharged.

The compression part 120 may include a fixed scroll 122 having a fixed rap 124 in an involute shape and fixed into the case 110, and an orbiting scroll 125 having an orbiting rap 127 in the involute shape and coupled to the fixed scroll 122 to enable a relative motion to the fixed scroll 122.

A main frame 116 for supporting the compression part 120 may be installed in an upper region of the case 110. A sub frame 118 for supporting a rotation shaft 181 of the interior permanent magnet type BLDC motor 130 may be positioned in a lower region of the case 110.

Figure 2:
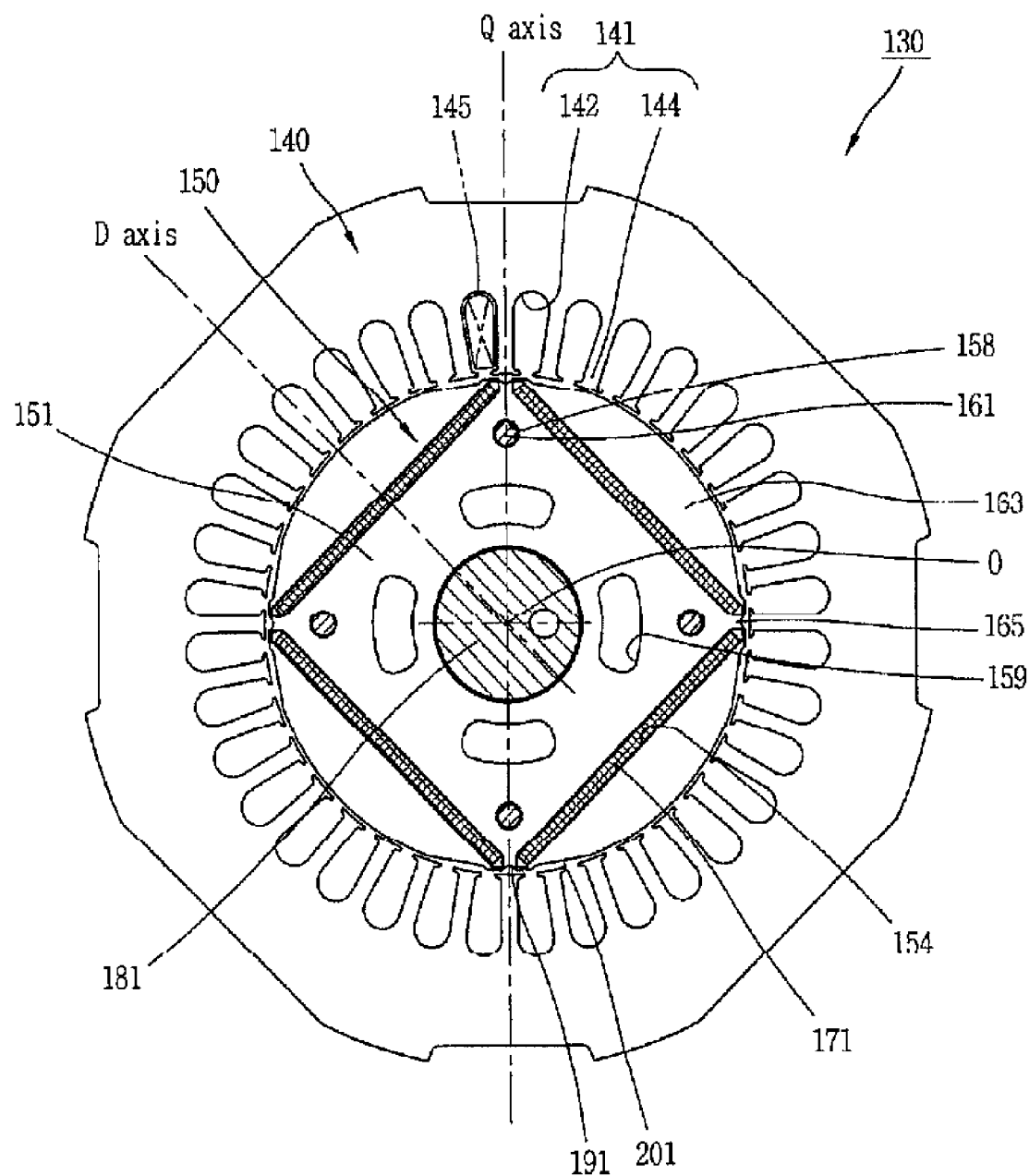
FIG. 2 is a plane view of the interior permanent magnet type BLDC motor of FIG. 1.

The interior permanent magnet type BLDC motor 130 may include a stator 140 fixed into the case 110, and a rotor 150 rotatable with respect to the stator 140. As shown in FIG. 1 and FIG. 2, the stator 140 may include a rotor accommodation hole 146 defined in a center of a stator core 141 for accommodating the rotor 150 therein. The stator core 141 has a plurality of slots 142 and teeth 144 defined in a circumferential direction of the rotor accommodation hole 146, and a stator coil 145 wound on the slots 142. Here, the stator coil 145 is, for example, configured as a distributed winding wound on two or more slots 142. Hereinafter, an example will be described that the stator 140 has thirty-six slots 142, the stator coil 145 is configured as a distributed winding and the rotor 150 has four poles.

Referring to FIG. 1 and FIG. 2 the rotor 150 may include a shaft hole 153 defined in a rotor core for accommodating the rotation shaft 181. The rotor core 151 has permanent magnet insertion portions 154 positioned around the shaft hole 153, and permanent magnets inserted in the permanent magnet insertion portions 154. Here, the rotor 150 may be positioned in the stator 140 and rotatable with respect to the stator 140. A preset gap B may exist between the rotor 150 and the stator 140 (see FIG. 3).

The rotation shaft 181 may be connected to the compression part 120, and upper and lower regions of the rotation shaft 181 may rotatably be fixed by the main frame 116 and the sub frame 118, respectively in a rotatable manner. An eccentric portion 185 for eccentrically moving the orbiting scroll 125 may be positioned at an upper end portion of the rotation shaft 181.

Referring to FIG. 2, the rotor core 151 may further have a plurality of electrical steel sheets 152 in a circular shape that the permanent magnet insertion portions 154 are passed through the electrical steel sheets 152. The electrical steel sheets 152 also may have coupling holes 158 passed through the electrical steel sheets 152 such that coupling members 161 for fixing the rotor core 151 can be coupled. The electrical steel sheets 152 may further have exhaust holes 159 passed through the electrical steel sheets 152 such that a refrigerant within the case 110 can flow through the exhaust holes 152.

The coupling members 161 may be configured as rivets inserted into the coupling holes 158 for fixing the electrical steel sheets 152. Alternatively, the coupling members 161 may include fixing bolts inserted in the coupling holes 158 and nuts coupled to exposed end portions of the fixing bolts.

Figure 9:
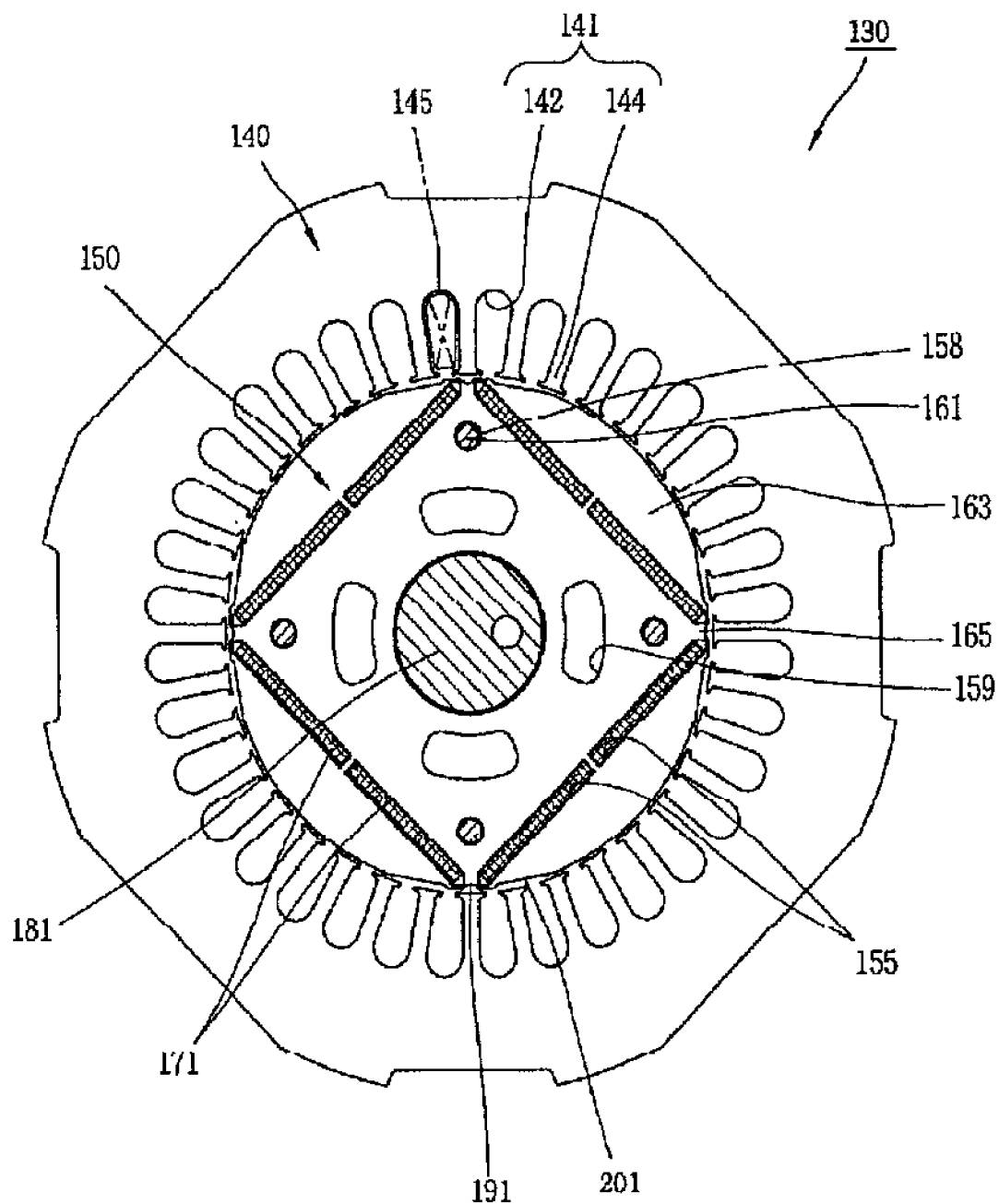
FIG. 9 is another plane view of an interior permanent magnet type BLDC motor.

The permanent magnet insertion portions 154 may be located at four positions, disposed perpendicular to each other, so as to define four magnetic pole portions 163. Here, as an another implementation shown in FIG. 9, each magnetic pole portion 155 may be divided into two parts disposed on the same line. Permanent magnets 172 having approximately a half width of the permanent magnet 171 shown in FIG. 2 may be inserted into the permanent magnet insertion portions 155, respectively.

Figure 3:
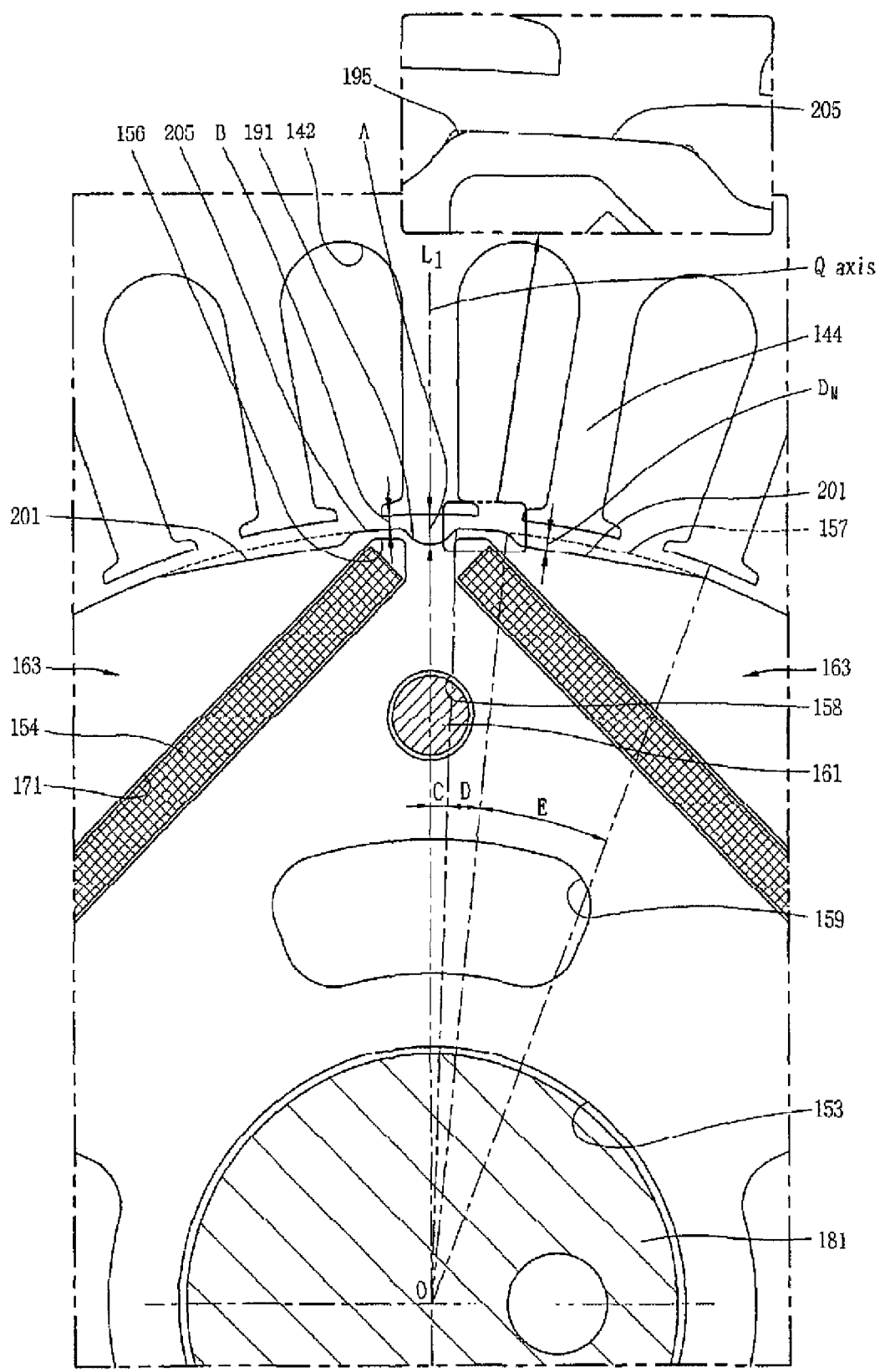
FIG. 3 is an enlarged view of main components of FIG. 2.

Referring to FIG. 2 and FIG. 3, flux barriers 156 for preventing a leakage of flux may be defined at both end portions of each permanent magnet insertion portion 154. Each of the flux barriers 156 may have a side connected to each permanent magnet insertion portion 154 and other side extending close to a circumference of the rotor core 151.

Accordingly, the rotor 150 may include four magnetic pole portions 163 (i.e., direct axes: D axes) defined by the permanent magnets 171 inserted in the permanent magnet insertion portions 154, and four horizontal axis (Q-axis) portions 165 each formed between the adjacent magnetic pole portions 163. As shown in FIG. 2, D axis denotes a virtual line connecting the center of each permanent magnet 171 and the center O of the rotor core 151, and Q axis denotes a virtual line passing the center O of the rotor core 151 and having an electric angle which defines 90° with D axis.

Referring to FIG. 3, the rotor 150 may have notches 191 cut off at the horizontal axis portions 165 in a radial direction. The notches 191 may reduce a leakage flux of the permanent magnets 171 at the horizontal axis portions 165, so as to make a waveform of a back electromotive force (B-EMF) or EMF similar to a sine wave without reducing a root mean square (RMS) value of the B-EMF. Accordingly, a torque ripple can be decreased, thereby improving vibration and noise characteristics in a normal (operating) state. Also, low noise and low vibration of a compressor can be implemented.

The notches 191 may be cut off in an arcuate shape. Here, the notches 191 may symmetrically be configured and a center of each notch 191 may be disposed on an exact center L1 (e.g., a central line) of each horizontal axis portion 165.

A maximum gap A that is increased by the notch 191 is, for example, defined one to four times as compared to the gap B. Here, a maximum gap A is defined between the stator 140 and the notch 191. For instance, if the gap B is 0.3 mm, the maximum gap A may be in the range of 0.6 mm~1.5 mm. In this implementation, the maximum gap of 1.2 mm is an effective position. Therefore, if the maximum gap A is below 0.6 mm, a flux leakage is increased. If the maximum gap A exceeds 1.5 mm, a motor efficiency is lowered.

Figure 4:
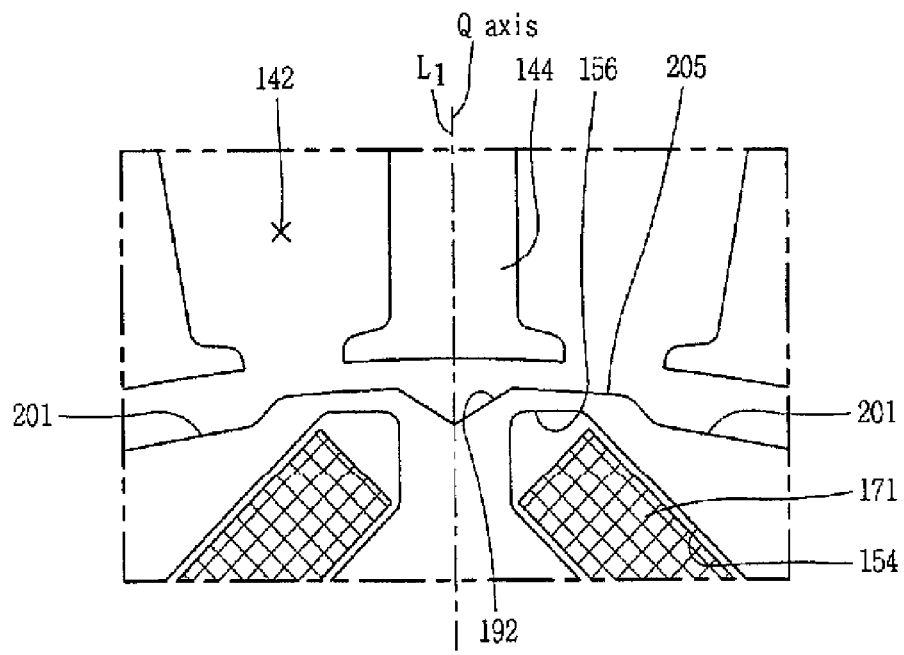
FIGS. 4 and 5 are enlarged views showing interior permanent magnet type BLDC motors respectively.

Alternatively, each of the horizontal axis portions 165, as shown in FIG. 4, may have a notch 192 defined as a triangular section (e.g., in a shape of "V"). Here, each notch 192 may have a symmetric shape and a center of each notch 192 may be positioned on the central line L1 of each horizontal axis portion 165.

Figure 5:
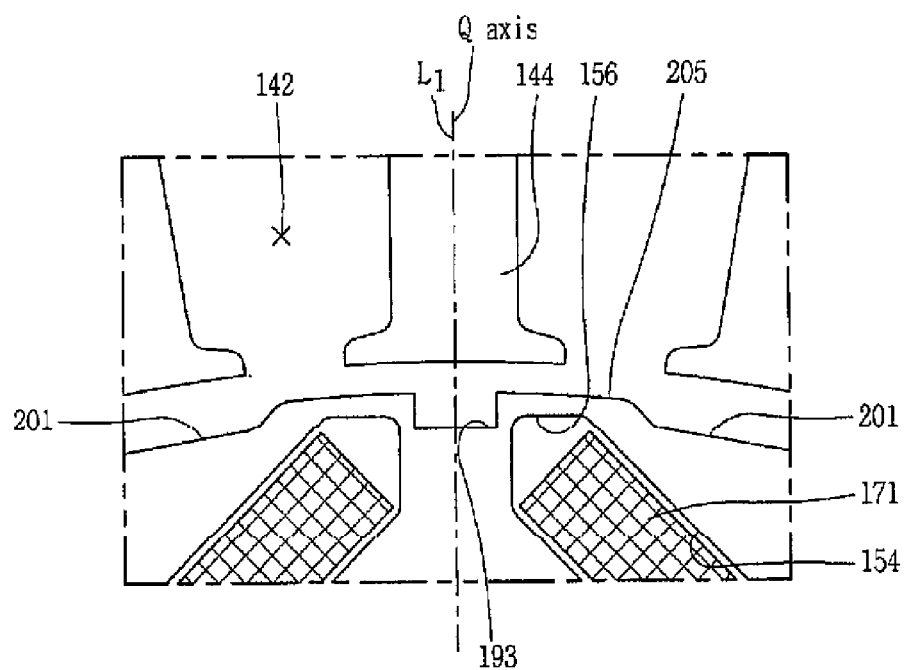

Also, as shown in FIG. 5, each of the horizontal axis portions 165 may be provided with a notch 193 defined as a square section (e.g., in a shape of trapezoid, parallelogram, rectangle, perfect square, "U", or the like). Here, the notch 193 may have an outer side that is wider (or the same), symmetrically configured, and a center of each notch 193 may be disposed on the central line L1 of each horizontal axis portion 165.

Referring to FIGS. 3-5, each magnetic pole portion 163 of the rotor 150 may further have a linear cut-off portion 201 defined by linearly cutting off a circumference by a predetermined length interval. The linear cut-off portion 201 may be configured to be spaced apart from the notch 191 with a predetermined distance in a circumferential direction. Accordingly, a non-cut-off circumferential portion 205 may be positioned between the notch 191 and the linear cut-off portion 201. The non-cut-off circumferential portion 205 may indicate an original circumferential portion of the electrical steel sheet 152 of the rotor core 151.

As shown in FIG. 3, rounding portion 195 has a radius of curvature and may be positioned at a boundary region between the notch 191 and the non-cut-off circumferential portion 205 or a boundary region between the non-cut-off circumferential portion 205 and the linear cut-off portion 201.

A ratio (D/C) of an angle D of the non-cut-off circumferential portion 205 to an angle C between a central line of the notch 191 and one side end of the notch 191 (e.g., a half of an angle of the notch 191) may be 0.5 to 3.0, for example 1.22 is effective. Here, if the ratio (D/C) is below 0.5, a deformation may occur upon a fast rotation. If the ratio (D/C) exceeds 3.0, a B-EMF is reduced, thereby lowering the motor efficiency.

The linear cut-off portion 201 may be configured to have a maximum depth $D_M$ near the non-cut-off circumferential portion 205 (in a radial direction). Based on this a waveform of a B-EMF can be produced similar to a sine wave.

Here, the maximum depth $D_M$ may indicate the largest value of distances from a circumference 157 of the rotor core 151 before being cut off to the linear cut-off portion 201.

Also, a ratio (E/C) of an angle E of the linear cut-off portion 201 to a half angle C of the notch 191 is 5 to 20, for example, 13.66 is effective. That is, if the ratio (E/C) is below 5, a flux leakage from the horizontal axis portions is increased. If the ratio (E/C) exceeds 20, a flux loss is increased, thereby lowering the motor efficiency. Alternatively, the linear cut-off portion 201 may be configured to have a maximum depth $D_M$ in a radial direction from a center of the linear cut-off portion 201(central line).

Figure 6:
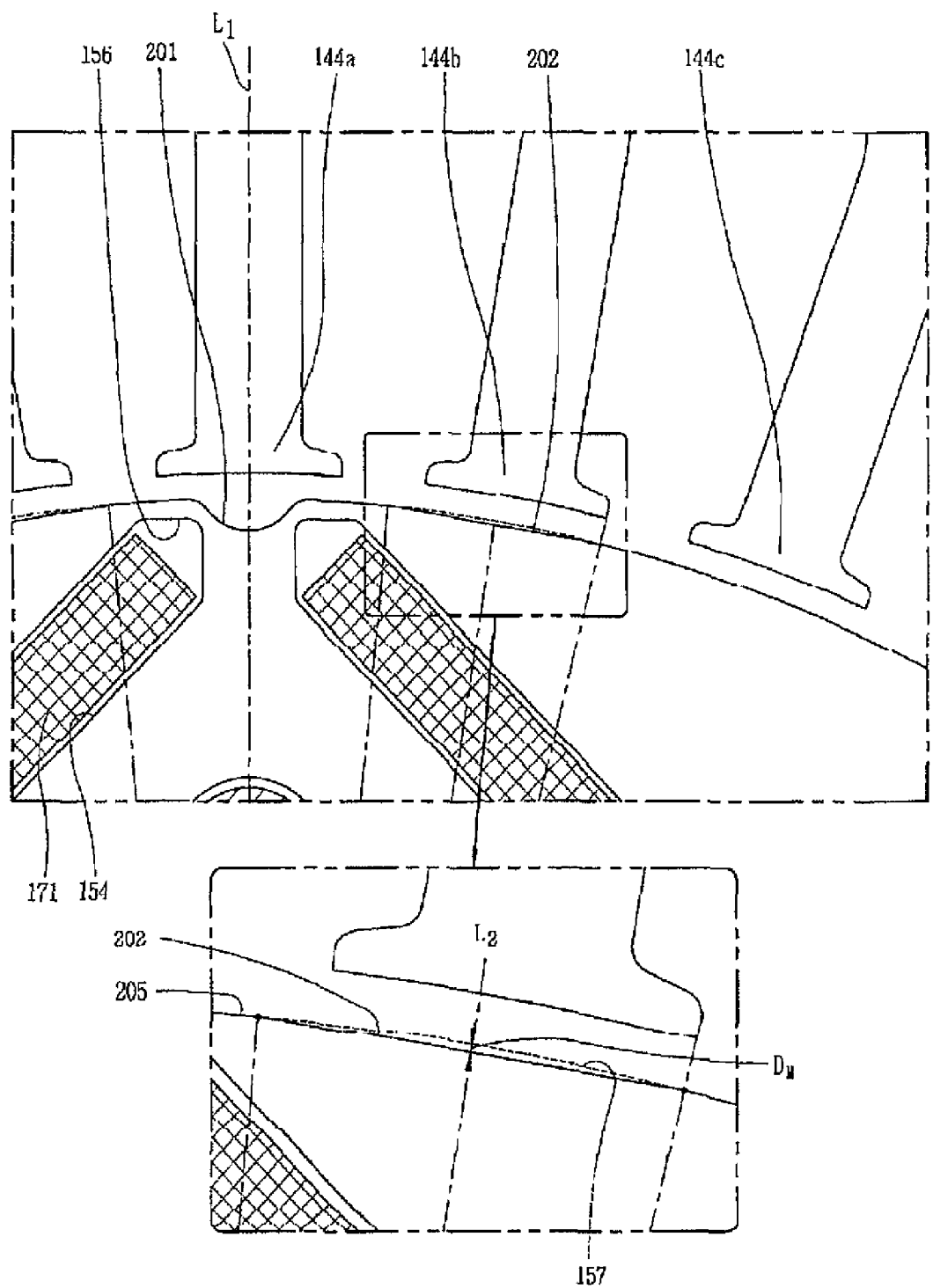
FIGS. 6 to 8 are views showing a linear cut-off region of interior permanent magnet type BLDC motors respectively.

As shown in FIG. 6, when a central line of the notch 191 is aligned with a central line of any one tooth (hereinafter, represented as 'reference tooth'), a linear cut-off portion 202 may be configured by straightly connecting an end of the non-cut-off circumferential portion 205 to an intersection point between a line, which connects an end (e.g., a right end) of a first tooth 144b positioned clockwise from a reference tooth 144a to the center of the rotor core 151, and the circumference 157 of the rotor core 151, and then cutting off an outer portion of the straight line. Here, the linear cut-off portion 202 may be configured to have, at its center (central line; L2), a maximum depth $D_M$ in a radial direction from the circumference 157 before being cut off, and may be symmetrical.

Figure 7:
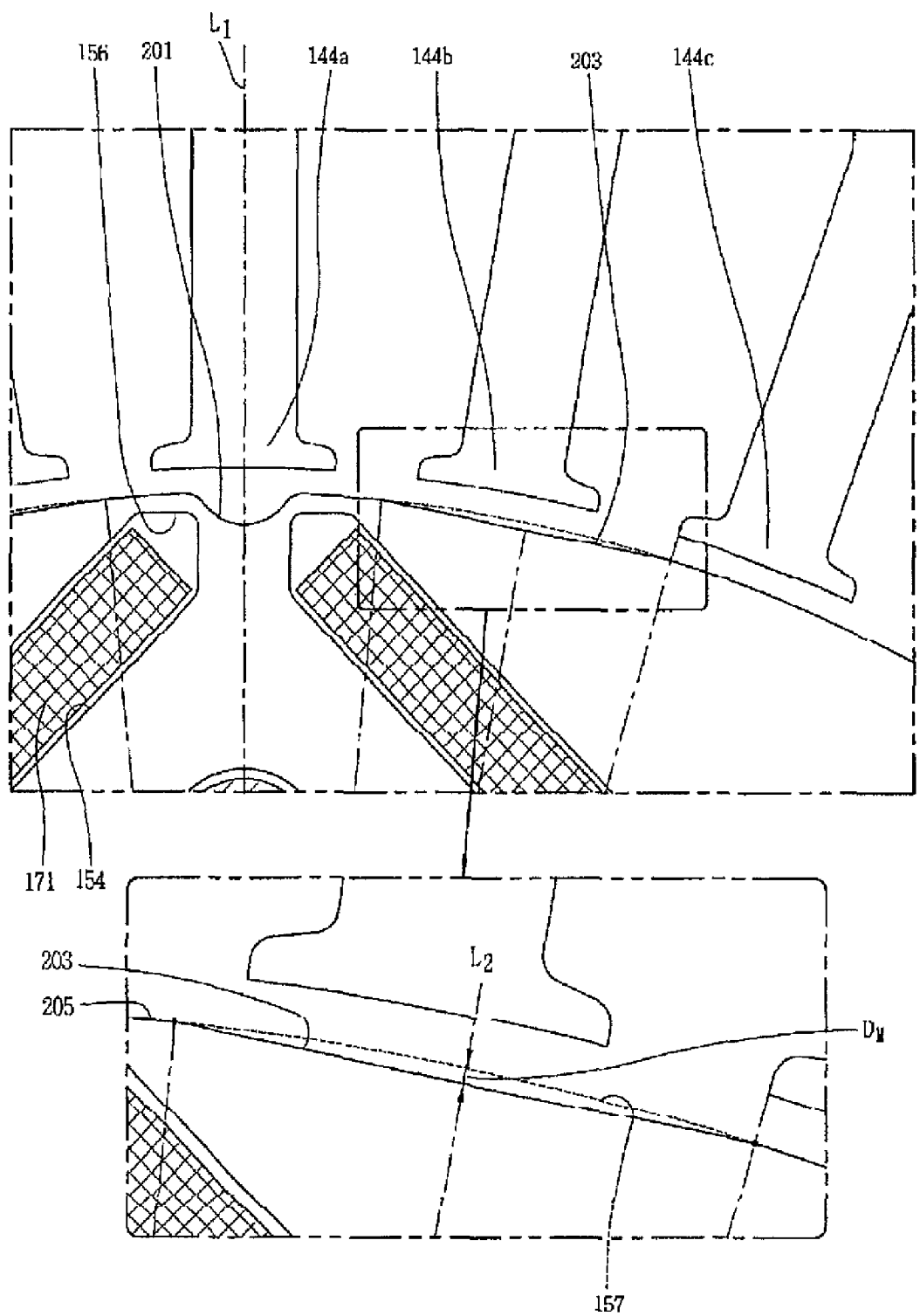

As shown in FIG. 7, a linear cut-off portion 203 may be configured by straightly connecting an end of the non-cut-off circumferential portion 205 to an intersection point between a line, which connects a starting end (e.g., a left end) of a second tooth 144c positioned clockwise from the reference tooth 144a to the center of the rotor core 151, and the circumference 157 of the rotor core 151, and then cutting off an outer portion of the straight line. Here, the linear cut-off portion 203 may symmetrically be configured to have, at its central line, a maximum depth $D_M$ from the circumference 157 before being cut off.

Figure 8:
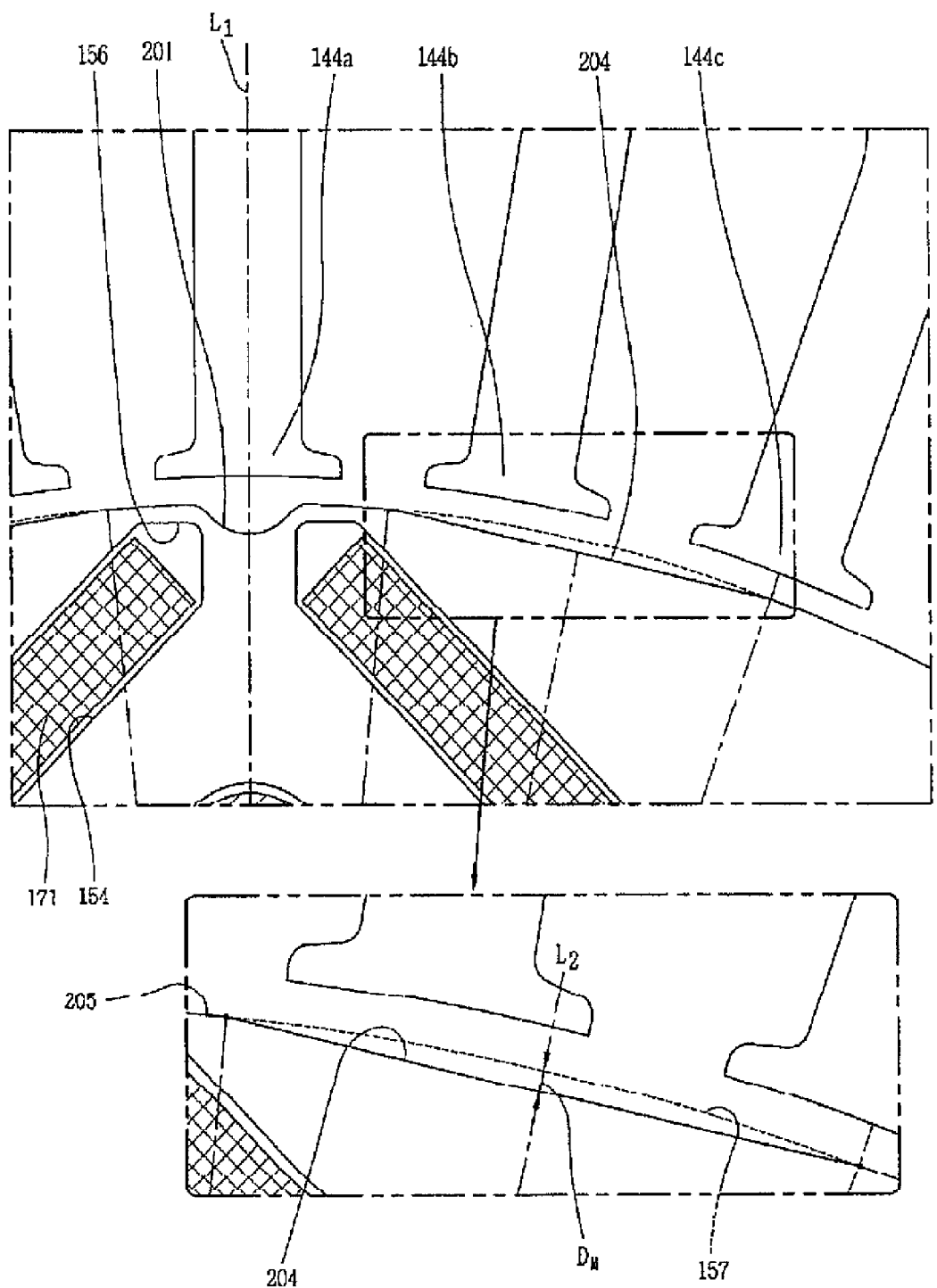

Also, as shown in FIG. 8, a linear cut-off portion 204 may be configured by straightly connecting an end of the non-cut-off circumferential portion 205 to an intersection point between a line, which connects a center of the second tooth 144c positioned clockwise from the reference tooth 144a to the center of the rotor core 151, and the circumference of the rotor core 151, and then cutting off an outer portion of the straight line. Here, the linear cut-off portion 204 may symmetrically be configured to have, at its central line, a maximum depth $D_M$ from the circumference 157 before being cut off. With such configuration, the interior permanent magnet type BLDG motor 130 can decrease about eighty percent of a torque ripple. Further, with such configuration a compressor employing the interior permanent magnet type BLDG motor can decrease seven to ten percent of noise.

As described above, a notch may be positioned between adjacent magnetic pole portions so as to reduce a flux leakage of magnets at horizontal axis (Q axis) portions. Hence, it is possible to reduce an occurrence of vibration and noise due to the torque ripple. Further, a notch is positioned at a center of each horizontal axis portion and a linear cut-off portion is positioned at each magnetic pole portion to be linearly cut off. Accordingly, a size of torque ripple due to a current of the stator can be decreased.

Also, the notch and the linear cut-off portion are spaced apart from each other with a predetermined distance in a circumferential direction and a non-cut-off circumferential portion is disposed between them. Hence, an interior permanent magnet type BLDC motor appropriate for a fast rotation can be provided.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. An interior permanent magnet type brushless direct current (BLDC) motor comprising:
   a stator having a plurality of slots and a stator coil wound on the slots; and
   a rotor configured to rotate with respect to the stator and having a rotor core, a plurality of permanent magnets positioned in the rotor core, and a plurality of cut off portions,
   wherein a plurality of first cut off portions each positioned between adjacent permanent magnets, a plurality of second cut off portions each configured to have a different shape from the first cut off portions and positioned between the first cut off portions, and a plurality of non cut off circumferential portions each positioned between one of the first cut off portions and one of the second cut off portions, wherein a maximum gap between the rotor and the stator is defined by the first cut off portions, wherein a minimum gap between the rotor and the stator is defined by the non cut off portions, and wherein a ratio of the depth of the first cut off portions to the minimum gap is in the range of 1.0 to 4.0.

2. The motor of claim 1, wherein a ratio of an inner angle of the non cut off circumferential portions to a half of an inner angle of the first cut off portions is in the range of 0.5 to 3.0.

3. The motor of claim 1, wherein the second cut off portions are positioned at outside of the permanent magnet.

4. The motor of claim 1, wherein the second cut off portions are configured to be cut off linearly.

5. The motor of claim 4, wherein a ratio of an inner angle of the linear cut-off portion of the second cut off portions to a half of an inner angle of the first cut off portions is in the range of 5 to 20.

6. The motor of claim 1, wherein an intermediate gap between the rotor and the stator is defined by the second cut off portions, the intermediate gap being a distance between the maximum gap and the minimum gap.

7. The motor of claim 1, wherein the plurality of permanent magnets positioned in the rotor core are located at four positions, disposed perpendicular to each other.

8. The motor of claim 1, wherein the plurality of permanent magnets are inserted into a plurality of permanent magnet insertion portions and flux barriers configured to reduce a leakage of flux are defined at both ends of each permanent magnet insertion portion.

9. The motor of claim 8, wherein each of the flux barriers has a side connected to one of the plurality of permanent magnet insertion portions and extends toward a circumference of the rotor core.

10. The motor of claim 1, wherein the ratio of the maximum gap to the minimum gap is in the range of 2.0 to 4.0.

11. The motor of claim 1, wherein the ratio of the maximum gap to the minimum gap is in the range of 3.0 to 4.0.

12. The motor of claim 1, wherein the ratio of the maximum gap to the minimum gap is about 3.0.

13. The motor of claim 1, wherein the minimum gap is about 0.3 millimeters and the maximum gap is in the range 0.6 to 1.5 millimeters.

14. The motor of claim 1, wherein the minimum gap is about 0.3 millimeters and the maximum gap is about 1.3 millimeters.

15. The motor of claim 1, wherein each of the second cut off portions is a linear cut off portion defined by linearly cutting off a circumference of the rotor by a predetermined interval.

16. The motor of claim 1, wherein each of the second cut off portions has a length along a circumference of the rotor that is greater than a depth that extends toward a center of the rotor.

17. The motor of claim 1, wherein, when a central line of one of the first cut off portions is aligned with a central line of a reference tooth of the stator, one of the second cut off portions is defined as a linear cut-off portion by straightly connecting an end of one of the non cut off circumferential portions to an intersection point between a line, which connects an end of a first tooth of the stator positioned clockwise from the reference tooth and cutting off an outer portion of the straight connection.

18. The motor of claim 1, wherein, when a central line of one of the first cut off portions is aligned with a central line of a reference tooth of the stator, one of the second cut off portions is defined as a linear cut-off portion by straightly connecting an end of one of the non cut off circumferential portions to an intersection point between a line, which connects a starting end of a second tooth positioned clockwise from the reference tooth and cutting off an outer portion of the straight connection.

19. The motor of claim 1, wherein, when a central line of one of the first cut off portions is aligned with a central line of a reference tooth of the stator, one of the second cut off portions is defined as a linear cut-off portion by straightly connecting an end of one of the non cut off circumferential portions to an intersection point between a line, which connects a center of a second tooth positioned clockwise from the reference tooth and cutting off an outer portion of the straight connection.

* * * * *